United States Patent
Shrivastava et al.

(10) Patent No.: US 8,775,456 B2
(45) Date of Patent: Jul. 8, 2014

(54) SYSTEM AND METHOD FOR SCHEDULED AND COLLABORATIVE DISTRIBUTION OF SOFTWARE AND DATA TO MANY THOUSANDS OF CLIENTS OVER A NETWORK USING DYNAMIC VIRTUAL PROXIES

(75) Inventors: Nitish Shrivastava, Mahaarashtra (IN); Neel Tiwari, Maharashtra (IN); Pranav Jha, Karnataka (IN)

(73) Assignee: BMC Software, Inc., Houston, TX (US)

( * ) Notice: Subject to any disclaimer, the term of this patent is extended or adjusted under 35 U.S.C. 154(b) by 650 days.

(21) Appl. No.: 12/552,169

(22) Filed: Sep. 1, 2009

(65) Prior Publication Data

US 2010/0114948 A1 May 6, 2010

Related U.S. Application Data

(60) Provisional application No. 61/110,720, filed on Nov. 3, 2008.

(51) Int. Cl.
*G06F 17/30* (2006.01)

(52) U.S. Cl.
USPC ........... 707/758; 707/913; 709/203; 709/219; 725/114; 725/145

(58) Field of Classification Search
USPC ........... 707/913–917, 758, 999.107, 999.003, 707/999.01; 725/114, 115, 135, 141, 145, 725/151–153; 709/203, 219
See application file for complete search history.

(56) References Cited

U.S. PATENT DOCUMENTS

| | | | | |
|---|---|---|---|---|
| 6,415,280 B1 * | 7/2002 | Farber et al. | ................ | 707/698 |
| 7,349,358 B2 * | 3/2008 | Hennessey et al. | ........... | 370/312 |
| 7,353,253 B1 * | 4/2008 | Zhao | ............................ | 709/204 |
| 7,539,767 B2 * | 5/2009 | Li | ................................ | 709/231 |
| 7,617,178 B2 * | 11/2009 | Chavez et al. | ....................... | 1/1 |
| 7,676,060 B2 * | 3/2010 | Brundage et al. | ............. | 382/100 |
| 7,734,730 B2 * | 6/2010 | McCanne | ..................... | 709/219 |
| 7,752,327 B2 * | 7/2010 | Li | ................................ | 709/231 |
| 7,793,112 B2 * | 9/2010 | Carpentier et al. | ........... | 713/190 |
| 7,827,298 B2 * | 11/2010 | Black et al. | ..................... | 709/231 |
| 7,843,855 B2 * | 11/2010 | O'Neal | ........................ | 370/256 |
| 7,844,712 B2 * | 11/2010 | Zuckerman et al. | .......... | 709/226 |
| 7,984,116 B2 * | 7/2011 | Hudson et al. | ................ | 709/219 |
| 8,001,096 B2 * | 8/2011 | Farber et al. | ................... | 707/698 |

* cited by examiner

*Primary Examiner* — Leslie Wong (57) ABSTRACT

A method and system for distributing content from a server computer to a number of client computers is disclosed. A file to be distributed to a requesting client computer is identified. If another client computer of the plurality of client computers can distribute the file to the requesting client computer, the requesting client computer requests the file from the other client computer. If no client computer can distribute the file to the requesting client computer, the requesting client computer requests the first file from the server computer. Then the requesting client computer receives the first file from either the other client computer or the server computer. Each client computer can act both as a client and a server to the other client computers, providing content that would otherwise be provided by the server computer.

17 Claims, 6 Drawing Sheets

SYSTEM AND METHOD FOR SCHEDULED AND COLLABORATIVE DISTRIBUTION OF SOFTWARE AND DATA TO MANY THOUSANDS OF CLIENTS OVER A NETWORK USING DYNAMIC VIRTUAL PROXIES

CROSS REFERENCE TO RELATED APPLICATIONS

This Application claims priority to U.S. Provisional Application Ser. No. 61/110,720 entitled "A System and Method for Scheduled and Collaborative Distribution of Software and Data to Many Thousands of Clients over a Network Using Dynamic Virtual Proxies" filed Nov. 3, 2008 and which is incorporated by reference in its entirety herein.

BACKGROUND

This disclosure relates generally to the field of computer software. More particularly, but not by way of limitation, it relates to the distribution of software and data to a large number of computer systems.

Distributing software and data to a large number of endpoints requires customers to provision a number of distribution points. These distribution points are dedicated servers and thus incur costs of maintenance and monitoring. As an organization grows and number of endpoints increase, there is a proportionate increase in the costs associated with these distribution points.

SUMMARY

In one embodiment, a method of distributing content from a server computer to a first client computer of a plurality of client computers is disclosed. The method comprises identifying a first file to be distributed to the first client computer. if a second client computer of the plurality of client computers can distribute the first file to the first client computer, the first client computer request the first file from the second client computer of the plurality of client computers. If no client computer of the plurality of client computers can distribute the first file to the first client computer, the first client computer requests the first file from the server computer. Then the first client computer receives the first file.

In another embodiment, an endpoint computer for use with a content distribution system comprising a server computer and a plurality of client computers is disclosed. The endpoint computer comprises a processor and a tuner process. The processor is programmed to execute the tuner process to identify a first file to be distributed to the endpoint computer. Then if a second client computer of the plurality of client computers can distribute the first file to the endpoint computer, the first file is requested from the second client computer of the plurality of client computers. But if no client computer of the plurality of client computers can distribute the first file to the endpoint computer, the first file is requested from the server computer. The first file is then received on the endpoint computer.

In another embodiment, a computer readable medium is disclosed. The medium has instruction stored on it that when executed cause the processor of a client computer to perform the method described above.

In another embodiment, a content distribution system is disclosed. The system comprises a server computer and a plurality of client computers. At least one of the client computers is programmed to perform at least a portion of the method described above, and the entire method is performed collectively by the plurality of client computers.

DETAILED DESCRIPTION

In the following, the term content should be understood to mean any type of information or data that can be transmitted as an electronic file. The data can include, but is not limited to, text, images, video, software executables, software source code, software patches, word processing documents, spreadsheets, etc.

The content distribution systems disclosed herein can use any convenient data communications network infrastructure, including, but not limited to, the public internet, private or public wide area networks, and private or public local area networks. The underlying infrastructure can use either wired or wireless communications technology, or a combination of both.

Enterprises interested in controlled distribution and replication of content across the enterprise have developed techniques for managing the distribution of that content. In a typical client-server system, a transmitter (a server with content to distribute) interacts with endpoints (clients that should have the content) to efficiently distribute the content from the transmitters to the endpoints. Tuner software associated with the endpoints makes requests for the content to the transmitter, receives the requested content, and stores the received content in an appropriate way for later use by the endpoint. In some systems, control mechanisms and protocols provide ways to update content already on the endpoints incrementally and in a bandwidth-efficient way.

As the number of endpoints increases, the load on the transmitters also increases, often beyond the capacity of the transmitter. One way in which typical content distribution systems have attempted to handle the increased load problem is by establishing a hierarchy of intermediate levels of servers between the main transmitter and the endpoints, sometimes known as repeaters. This hierarchy of intermediate servers must be provisioned and managed, and appropriate placement of the repeaters can be problematic in changing environments.

Even with repeaters, the increasing load on transmitters and other parts of the distribution network caused by increasing numbers of endpoints can be detrimental to network performance as a whole. Enterprises have resorted to increasing the number of transmitters, repeaters, and even staggering content distribution over multiple networks. While that strategy can improve the performance and scalability of the distribution system, there are increased costs to the enterprise.

The strategy outlined above forces enterprises to provision increasing numbers of servers (whether transmitters or repeaters) in order to provide efficient and high-performance content distribution. As the size of the enterprise increases, the number of endpoints also increases, so additional servers must be provisioned and incorporated into the content distribution infrastructure, resulting in increased costs associated with maintaining the content distribution infrastructure.

Where enterprises are geographically distributed, more servers are typically required than in a less spread out enterprise. Each location may need a server in close proximity to its endpoints to maximize network download speeds, reducing latency caused by large physical separation. Bandwidth considerations at far-flung locations may make providing adequate performance difficult, where a server cannot be placed close to the endpoints, or where the endpoints are connected to servers through relatively low-speed connections.

Furthermore, as the enterprise continues to change, what was a carefully planned infrastructure of repeaters may no longer be appropriate. Areas that have outgrown their current repeaters may need additional distribution resources and areas that have shrunk may have an infrastructure that wastes resources that were previously needed. Either situation costs the enterprise to re-provision the infrastructure, with no surety that the re-provisioning will be adequate after future changes to the enterprise.

Figure 1:
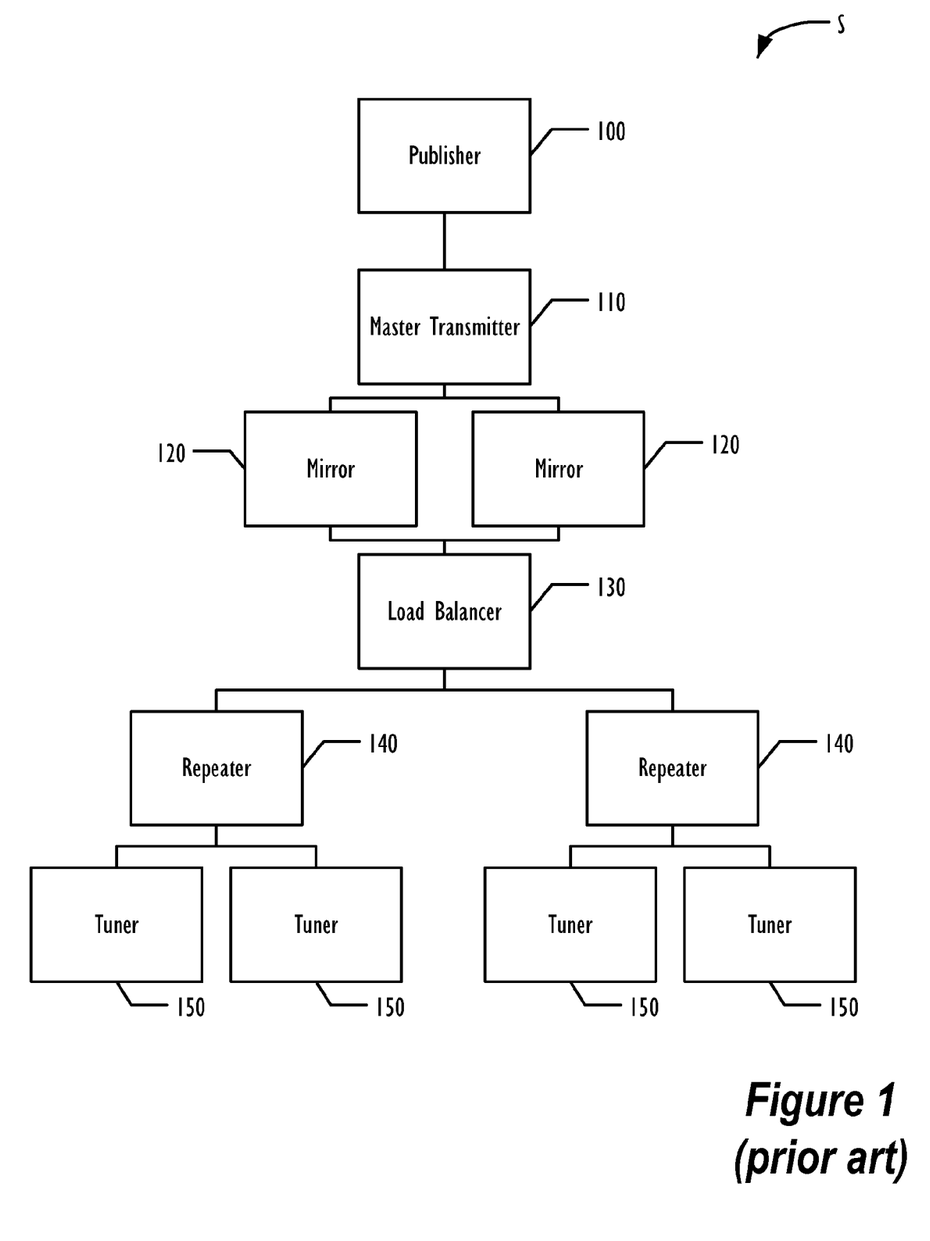
FIG. 1 shows, in block diagram form, an example of a distribution system according to the prior art.

FIG. 1 is a block diagram illustrating a system S according to the prior art for distributing content to a large number of endpoints. For clarity, only four endpoints are shown in FIG. 1. Although the disclosure below is written in the context of delivery to a large number of endpoints, the number of endpoints is not a limitation hereto, as long as there are at least two endpoints in the distribution system.

In the system S, a publisher computer 100 generates content for distribution across the distribution system S. The publisher 100 does not need to know the structure of the distribution system S, or how content is distributed across the system S. The publisher 100 can be any computer or collection of computers that generates content and provides it to a master transmitter computer 110 for delivery to requesters. The master transmitter 110 is responsible for delivering the content across the distribution system S to endpoints 150. Software associated with the endpoints 150 responsible for interacting with the distribution system S is referred to as a tuner. The content for delivery can be stored in any convenient or desirable way, and need not be stored by the master transmitter 110, as long as the content is available to the master transmitter 110 when needed for delivery to requestors.

Not all versions of the system S include all of the blocks illustrated in FIG. 1. In some versions of the system S, two or more mirror computers 120 can be used to provide redundancy, backup, and load balancing for network performance and reliability reasons. Each of the mirrors 120 obtains content from the master transmitter 110 and serves it out as if the content was being delivered from the master transmitter 110. Typically, a load balancing software and/or hardware 130 hides the existence of the individual mirror computers 120, directing requests to one of the mirror computers 120 based on a load balancing policy defined for the load balancer 130. The mirrors auto-replicate all of their content from the master transmitter 110, and behave to the endpoints as if they were the master transmitter 110. Therefore, the mirrors 120 will not be discussed further herein, as such mirroring is well known in the art, and the system S will be described for clarity as if all content is delivered by the master transmitter 110 directly, without intervening mirror computers 120.

At a lower level of the hierarchy of the system S, repeaters 140 provide additional capacity for delivery. Each repeater 140 can serve a collection of endpoints 150, avoiding the need for the endpoints to connect with the master transmitter 110 when requesting delivery of content. In some versions of the system S, the repeaters can provide content for more than one master transmitter 110. The repeaters 140 are typically placed geographically closer to the endpoints 150 than the master transmitter 110, but can be provisioned in any convenient location that can communicate with the endpoints 150.

The repeaters 140 redirect client requests from the master transmitter 110. The repeaters regularly auto-replicate some or all of the content from the master transmitter 110, providing better performance. As endpoints 150 make requests of the master transmitter 110, those requests are satisfied by the repeater 140 by redirection of the endpoint 150's request. Although the repeaters 140, which are dedicated servers, can improve performance as discussed above, provisioning and managing the repeaters 140 can be costly.

Figure 2:
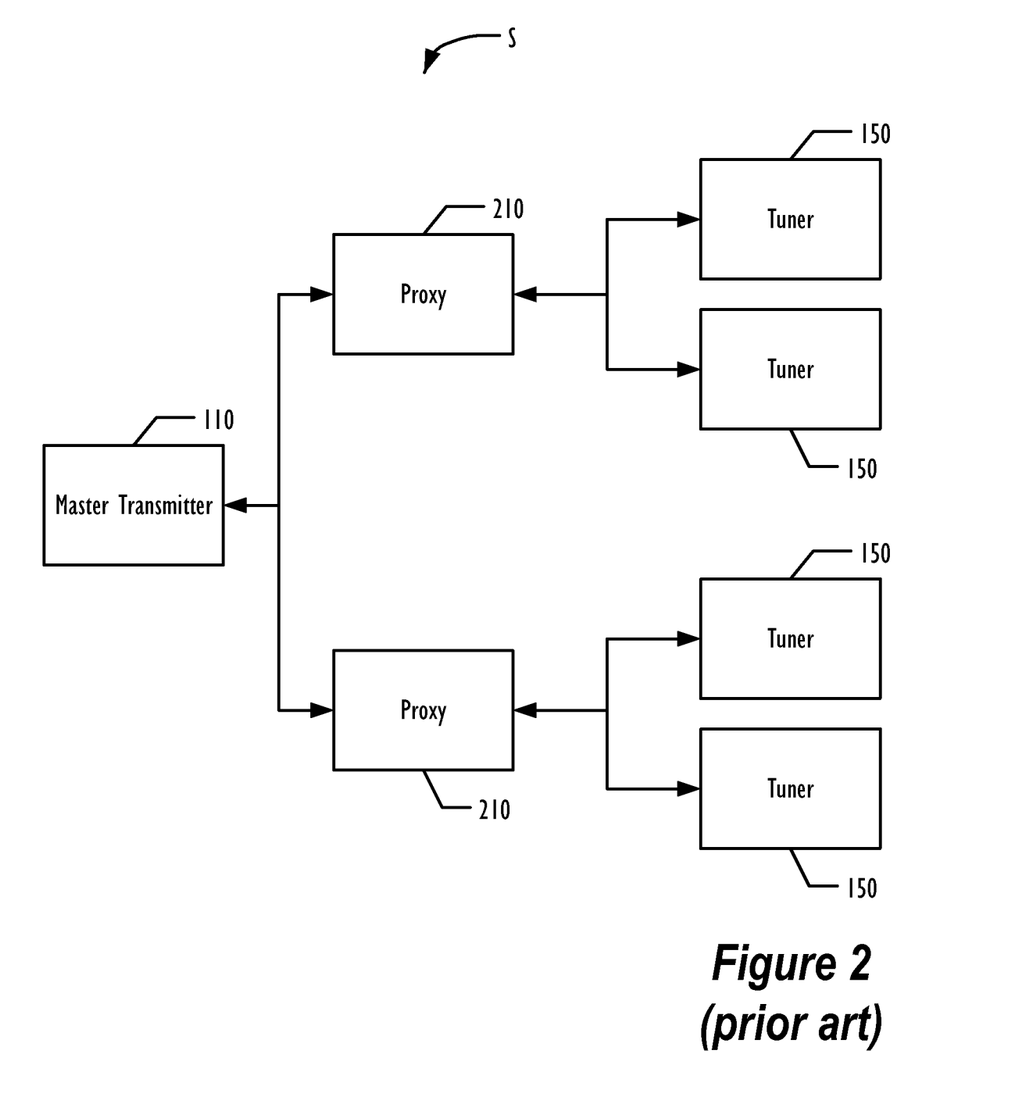
FIG. 2 shows, in block diagram form, other example elements of the distribution system of FIG. 1.

FIG. 2 is a block diagram illustrating another possible structure of the distribution system S. Where endpoints 150 are in remote locations and do infrequent updates of the content, proxy computers 210 can serve as intermediaries between the master transmitter 110 and the endpoints 150, instead of repeaters 140. The proxies 210 broker endpoint requests and send files back to the endpoints 150 on behalf of the master transmitter 110. Unlike a repeater, a proxy 210 does not auto-replicate the content, but only obtains content that has been requested by an endpoint 150, typically caching that content for later use. A first endpoint 150's request may cause the proxy 210 to forward the request to the master transmitter 110, but subsequent requests can be filled by the proxy 210 from content cached by the proxy 210. Sometimes a proxy 210 preloads its cache. A proxy 210 responds to individual file requests, rather than requests for an entire channel of content.

As with repeaters 140, however, proxies 210 are dedicated servers that must be provisioned and managed to optimize content distribution. This becomes particularly important when the system S is responsible for distributing content to large numbers of endpoints 150.

Figure 3:
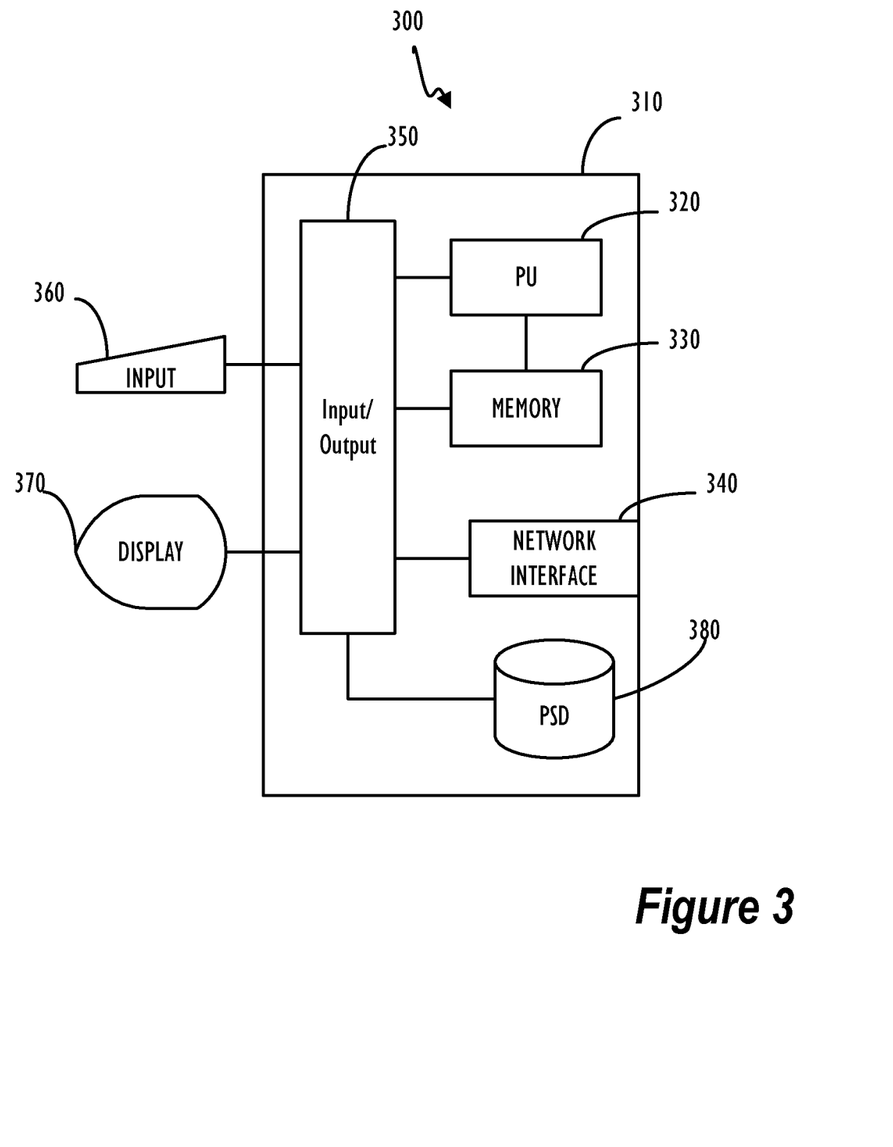
FIG. 3 shows, in block diagram form, an example endpoint computer system.

Referring now to FIG. 3, an example endpoint computer system 300 is shown. Example endpoint computer system 300 comprises a system unit 310 which may be optionally connected to an input device or system 360 (e.g., keyboard, mouse, touch screen, etc.) and display 370. A program storage device (PSD) 380 (sometimes referred to as a hard disc) is included with the system unit 310. Also included with system unit 310 is a network interface 340 for communication via a network with other computing and corporate infrastructure devices (not shown). Network interface 340 may be included within system unit 310 or be external to system unit 310. In either case, system unit 310 will be communicatively coupled to network interface 340. Program storage device 380 represents any form of non-volatile storage including, but not limited to, all forms of optical and magnetic storage elements including solid-state storage, and may be included within system unit 310 or be external to system unit 310. Program storage device 380 may be used for storage of software to control system unit 310, data for use by the endpoint computer system 300, or both.

Figure 4:
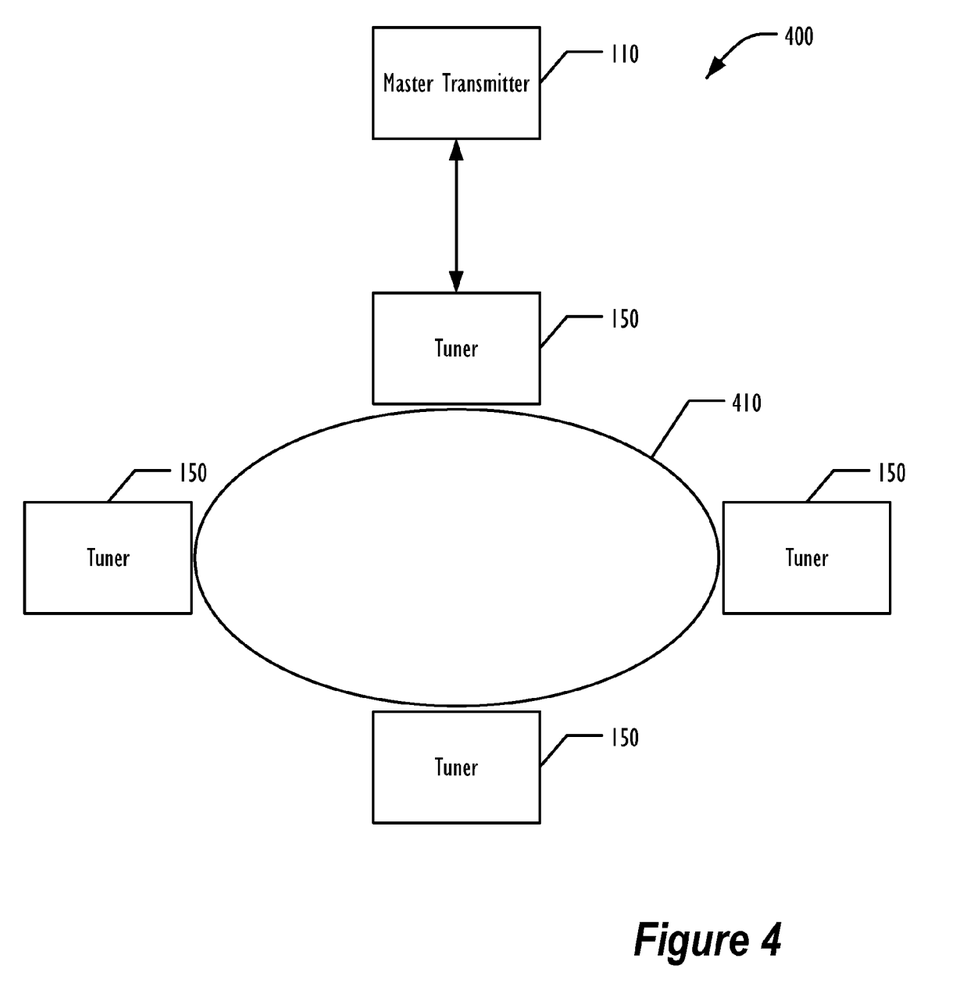
FIG. 4 shows, in block diagram form, one embodiment of a system for requesting files from other endpoints instead of or in addition to a master transmitter.
Figure 5:
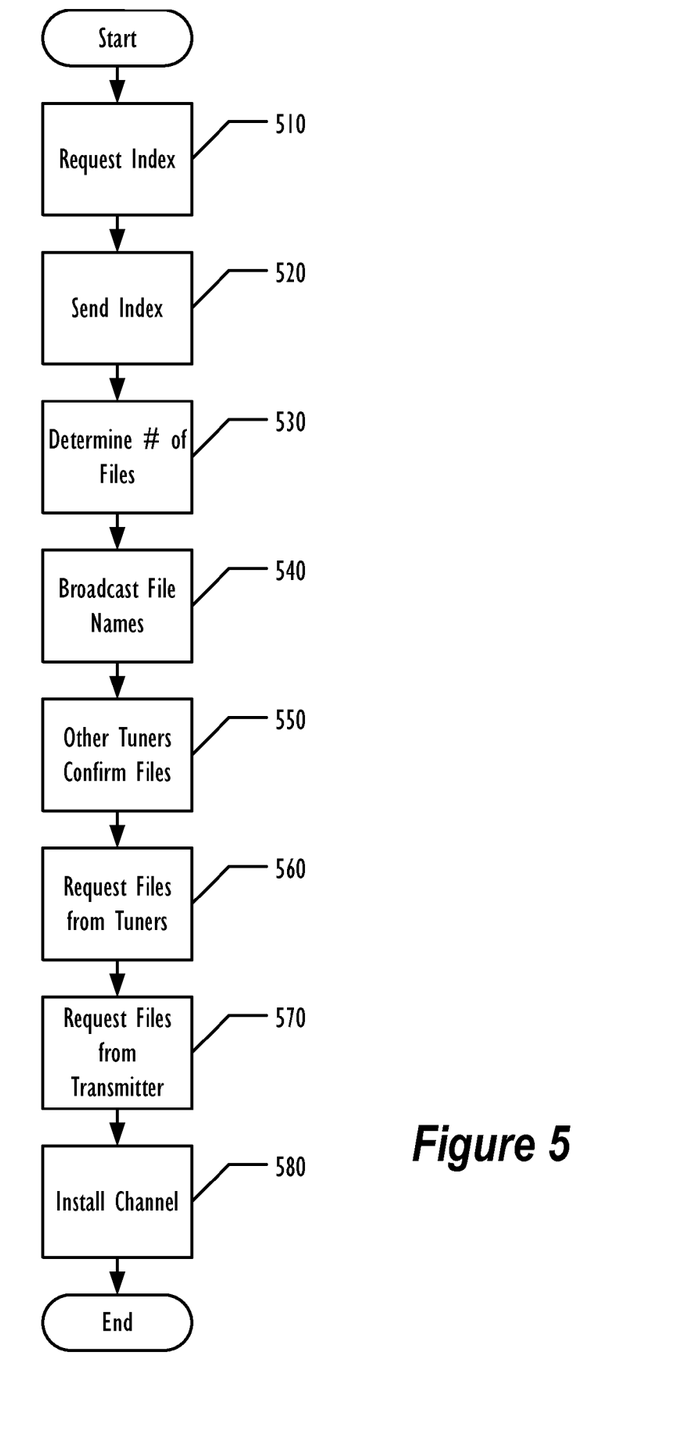
FIG. 5 shows, in flowchart form, an example of one embodiment of a technique for requesting files from other endpoints instead of or in addition to a master transmitter in a system such as illustrated in FIG. 4.
Figure 6:
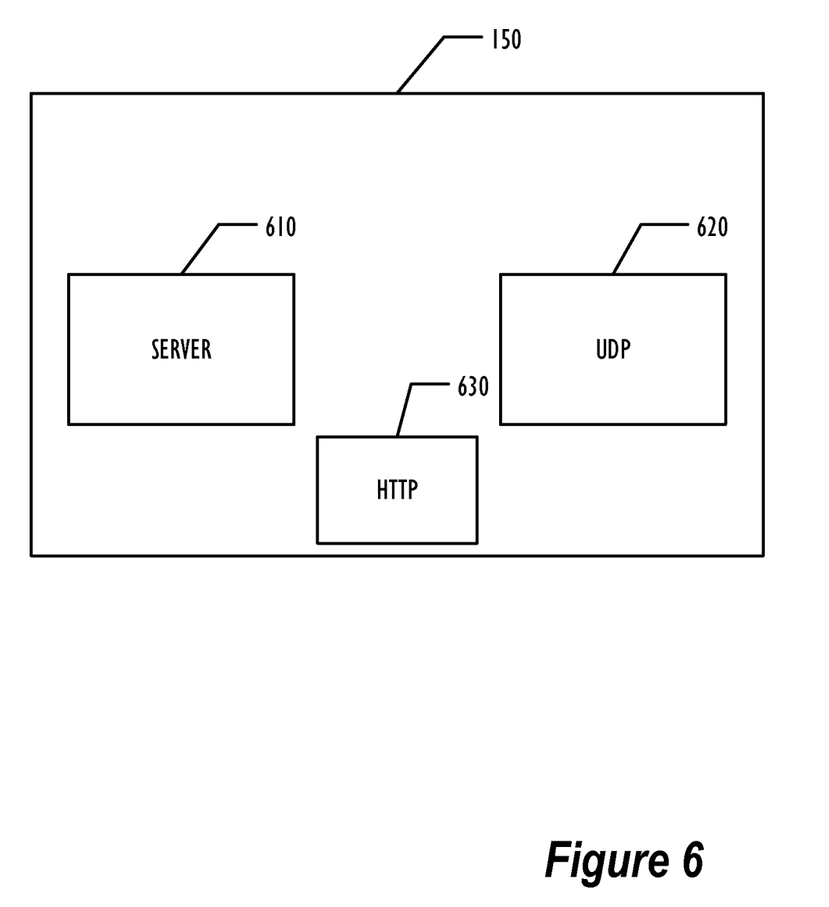
FIG. 6 shows, in block diagram form, an example endpoint tuner software and modules thereof according to one embodiment.

System unit 310 may be programmed to perform methods in accordance with this disclosure (examples of which are in FIGS. 4-6). System unit 310 comprises a processor unit (PU) 320, input-output (I/O) interface 350 and memory 330. Processing unit 320 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company.) Memory 330 may include one or more memory modules and comprise random access memory (RAM), read only memory (ROM), programmable read only memory (PROM), programmable read-write memory, and solid-state memory. One of ordinary skill in the art will also recognize that PU 320 may also include some internal memory including, for example, cache memory.

FIG. 4 is a block diagram illustrating an embodiment of a content distribution system 400 that can avoid some of the provisioning problems of the system S of FIGS. 1 and 2. As with system S, the system 400 distributes content from a master transmitter 110 to multiple endpoint computers 150. The system 400 can contain all of the features of the system S described above, but has additional capabilities as described below.

At a high level of description, whenever one of the endpoints 150 of the system 400 needs to obtain content, instead of getting that content from the master transmitter 110 as described above, the endpoint 150 first queries the other endpoints 150 on its subnet 410. If one or more of the other endpoints 150 has the desired content, the requesting endpoint 150 can obtain the content from the other endpoints 150, avoiding the need to obtain the content from the master transmitter 110. If the desired content is not available locally from another endpoint 150, then the requesting endpoint 150 may obtain the content from the master transmitter 110 as described above.

Because communication on the local subnet is generally faster than communication between the endpoint 150 and the master transmitter 110, the content can be delivered faster. In addition, the load on the master transmitter 110 may be significantly reduced because fewer requests are satisfied by the master transmitter 110. Thus, the number of repeaters 140 can be similarly reduced, eliminating costly provisioning of dedicated servers.

In one embodiment, the content is packaged into collections of related files, sometimes referred to as channels. When an endpoint 150 makes a request for content, it first requests information about the channel, to obtain the files contained in the channel. The endpoint 150 then requests each individual file in the channel that it does not already hold. Once the endpoint 150 receives all of the files in the channel, then it can take further actions upon the received channel of content, such as installing a new version of a software package. In the system S, all individual file requests are sent to the master transmitter 110, possibly redirected to the relevant repeater 140 or a proxy 210. In contrast, in the system 400, many of those individual file requests are sent to other endpoints 150 that have indicated that they already have the needed file. Any file that no other endpoint 150 has can still be obtained from the master transmitter 110.

FIG. 5 is a flow chart illustrating, at a high level, a workflow for obtaining content in the system 400 according to one embodiment. In block 510, the endpoint 150 requests a channel index from the master transmitter 110. Then in block 520, the master transmitter 110 responds by sending back the channel index, which is received by the endpoint 150.

In one embodiment, this communication between the endpoint 150 and the master transmitter is performed according to an application distribution protocol (ADP) that allows for efficient processing of the index information. In this embodiment, the endpoint 150 and the master transmitter 110 both maintain a copy of the index, and the endpoint 150 requests an update to the index by sending its copy to the master transmitter 110, which replies with a set of editing operations that the endpoint 150 applies to its copy of the index to update it to match the transmitter 110's index. In one embodiment, the endpoint 150 can first send a top-level identifier for the index. If the transmitter 110 has an index in its cache by that identifier, that saves the endpoint 150 from having to send the possibly large index. Once the endpoint 150 has received the editing operations and updated its copy of the channel index, then it can proceed to determine which files must be requested from the channel index. In another embodiment, the master transmitter 110 sends an updated channel index to the endpoint 150 upon a request from the endpoint 150.

The format of the channel index is not significant, and any desired format can be used. In general, however, the channel index can be considered a list of files. In one embodiment, in addition to the file name, the channel index contains additional information sufficient to identify the correct version of the file, such as an MD5 checksum, that the endpoint 150 can use to determine whether the endpoint 150 needs to update its local copy of a file contained in the channel index. If the endpoint 150 already holds a satisfactory copy of the file, it does not need to request the file. If the endpoint 150 does not hold a copy of the file, or the copy of the file does not match the copy held by the master transmitter 110 as identified by the channel index, then the endpoint 150 may request the file. Other techniques for determining whether the copy of a file held by the endpoint 150 needs to be updated can be used. For example, instead of a checksum, the channel index can contain a version identifier and/or timestamp information that can be compared with the local values for that file. Any reference herein to an endpoint 150 holding (or not holding) a file should be understood to refer to the endpoint 150 holding (or not holding) the version of the file identified by the channel index.

Returning to FIG. 5, in block 530, the endpoint 150 analyzes the channel index to determine how many and which files it needs to obtain. Then in block 540, instead of requesting the needed files from the master transmitter 110, the endpoint 150 broadcasts the needed file information to all other endpoints on its subnet. In one embodiment, the endpoint 150 sends a separate UDP packet identifying each needed file. Other techniques than UDP broadcasts may be used for requesting information from the other endpoints 150, and the requests can identify more than one file if desired. By broadcasting the requests, the endpoint 150 can make a single request that is received by all other endpoints 150 on its subnet, instead of having to identify the other endpoints 150 and sending individual requests to each other endpoint 150.

After the last UDP packet is broadcast in the subnet, the endpoint 150 spends a finite amount of time listening on its UDP port for reply packets sent on the subnet. In one embodiment, this "wait" period is 2 seconds.

In block 550, the other endpoints 150 on the subnet respond to the broadcast packet. These responses are sent by endpoints 150 that receive the broadcast request made in block 540, and that have the required file in their storage. These responses contain sufficient information to allow the endpoint 150 to request a file from the responding endpoint 150, such as the host machine name and port on which the responding endpoint 150 is able to service requests for files.

In one embodiment, endpoints 150 that receive the broadcast information request can respond that the endpoint 150 has the requested file, or that the endpoint 150 is currently obtaining the file from elsewhere. In the latter situation, the response can indicate how much of the file has already been obtained. For example, a responding endpoint 150 can respond that it is currently downloading the requested file and has received 70% of the file at the time of the response. Other information can be included in the response that might be useful for the requesting endpoint 150, including, but not limited to, information about the current load on the responding endpoint 150, and how many other requests for files the responding endpoint 150 is currently serving, i.e., how many clients are receiving requested files from the responding endpoint 150.

At the conclusion of the "wait" period described above, the endpoint 150 organizes the information it has received, and based on an algorithm, decides which endpoints 150 to send requests for files. The requesting endpoint 150 can use a predetermined policy to make decisions on which of multiple endpoints 150 responding to a request for a file should be used for obtaining the file. In one embodiment, the first endpoint 150 to respond confirming that it has the requested file is selected by the requesting endpoint 150 to serve the requested file. Other more complex techniques can be used for selecting among multiple endpoints 150 that responded that they hold the file. For example, in one embodiment, if two endpoints 150 respond that they have the same file, the one reporting the least amount of load would be selected. In another embodiment, if two endpoints 150 respond that they are downloading the same file, the one reporting having received the largest amount of the file would be selected. Other criteria can be used, including combinations of criteria. For example, if one endpoint 150 reports it is downloading the requested file and has 50% of the file and is heavily loaded, and another endpoint reports it has downloaded 40% of the file and is lightly loaded, the requesting endpoint 150 may select the lightly loaded endpoint, even though it currently has less of the requested file. In another example, a requesting endpoint 150 can choose not to select an endpoint that is downloading a file and has downloaded less than a predetermined amount of the requested file (e.g., 30%).

Once the determination is made in block 550, the requesting endpoint 150 requests files from the responding endpoints 150 in block 560. In one embodiment, the endpoints 150 may be able to go into a mode in which only minimal functionality is performed by the endpoint 150. If the endpoint 150 selects a responding endpoint 150 that is in such a mode, the requesting endpoint 150 may need to "wake up" the responding endpoint 150 before the responding endpoint 150 can respond to the file request.

Because different responding endpoints 150 may have responded regarding different files, the requesting endpoint 150 can make multiple requests, one per file, to multiple responding endpoints 150. In one embodiment, a requesting endpoint 150 can select multiple endpoints to serve different portions of a large file concurrently. In another embodiment, a requesting endpoint 150 may issue requests for more than one file to any given selected endpoint 150.

If no endpoint 150 responds that it has a requested file, or if none of the responding endpoints 150 meets the policy criteria set for the endpoint 150, then in block 570 the requesting endpoint 150 sends a request to the master transmitter 110 for the file. Thus, for a given channel, a requesting endpoint 150 can obtain files only from other endpoints 150, only from the master transmitter 110, or from a combination of other endpoints 150 and the master transmitter 110. Thus, the load of request on the master transmitter 110 can be significantly reduced. Because the system 400 may also include mirrors 120, repeaters 140, and proxies 210, as in the system S, any requests to the master transmitter 110 may be redirected to one of the mirrors 120, repeaters 140, or proxies 210, as described above.

Once all of the files that are needed are obtained or updated by the endpoint 150, then in block 580 the content defined by the channel can be installed on the requesting endpoint 150. This can involve anything from simply storing the files on storage associated with the endpoint 150 to execution of executable materials contained in the content.

In one embodiment, the file transfer can include a checkpoint/restart capability to handle situations where a requesting endpoint 150 is unable to download the entire requested file successfully, either because of a problem in the intervening network or because of a problem at the receiving endpoint 150 or a problem at the sending endpoint 150 or master transmitter 110. In this embodiment, a sequence of checkpoints may be created while the file is being received by the requesting endpoint 150. The requesting endpoint keeps a list of all of the endpoints 150 that indicated they held (or were downloading) the requested file. If an attempt to obtain the file fails, then the requesting endpoint can attempt to pick up the download from a previous checkpoint, typically the most recent checkpoint. If the original endpoint 150 that was serving the requested file to the requesting endpoint 150 is no longer reachable, then the requesting endpoint can select the next responding endpoint and retry the request from the checkpoint in the file, thus avoiding having to obtain the entire file, including the portion already received.

Endpoints 150 that receive the broadcast file requests may respond to the request if they hold the file, but can refuse the request to obtain the file if the endpoint 150 is too busy. In one embodiment, a predetermined policy for an endpoint may determine how many concurrent file requests the endpoint 150 will accept. In such an event, when the requesting endpoint 150 makes the request, the other endpoint 150 can reject the request. The requesting endpoint 150 then selects the next responding endpoint 150 from the list of responding endpoints 150 and remakes the request for the file.

In one embodiment, a requesting endpoint 150 may select a responding endpoint 150 that for some reason is unable to respond to the request for the file. In such an event, when the requesting endpoint 150 determines the responding endpoint 150 is unable to satisfy the request for a file, the requesting endpoint 150 then may select the next responding endpoint 150 from the list of responding endpoints 150 and remake the request for the file.

If for some reason none of the responding endpoints 150 are willing or able to satisfy the request, then in one embodiment the requesting endpoint 150 may iterate through the list of responding endpoints a predetermined number of times before sending the request to the master transmitter 110.

As one of skill in the art will appreciate, the first endpoint 150 on a subnet that needs to obtain a particular content typically discovers through the above technique that none of the other endpoints 150 has that content. Thus, the first endpoint on the subnet to need the content typically requests that content from the master transmitter 110. Subsequent endpoints 150, however, may request the content from endpoints that previously requested it. According to one embodiment, a scheduler randomizes scheduling endpoints 150 requesting content, so that all endpoints 150 do not attempt to request the content simultaneously. This tends to ensure that at least some of the content will be available from another endpoint 150 for the majority of endpoints 150.

In the prior art system S, the endpoints 150 are only clients of the master transmitter 110 and are not servers for the content. The endpoints 150 can act as servers for other purposes, however. In embodiments of the system 400, the endpoints 150 may also contain server capability to allow them to serve the content to other endpoints 150 on their subnet. In some embodiments of the system 400, some of the endpoints 150 may contain server capability, while other endpoints 150 may not. Endpoints 150 that do not contain the server capability do not respond to the broadcasts described above.

Turning to FIG. 6, in one embodiment, the server capability of the endpoints 150 is contained in a server module 610 of the tuner software for the endpoint 150. The server module 610 is responsible for implementing the server's basic functionality. The server is responsible for handling connections (HTTP, HTTPS, RPC, and RPC over SSL) which are received from other endpoints 150 and processing the requests for file delivery. In one embodiment, an HTTP module 630 provides handlers for the connection management. The server module 610 is capable of communicating with requesting endpoints 150 using the same protocol that the endpoints 150 use to communicate with the master transmitter 110. In one embodiment, the master transmitter 110 supports compressing the content for faster delivery to the endpoints 150, while the endpoint 150's server module does not support compression for content delivered to other endpoints 150. Although such compression is less necessary on the local subnet than on the longer connections to the master transmitter 110, other embodiments can support compression by the endpoints 150 when serving content to other endpoints 150.

Similarly, another portion of the endpoint 150's tuner software in one embodiment is contained in a UDP module 620. The UDP module 620 is responsible for (a) implementing a packet-based protocol for interaction between endpoints 150 on the subnet, (b) initializing a server which uses the above protocol to generate packets over the subnet, and simultaneously listens on it, and (c) initializing a client component which interprets packets sent by the server, and kicks off operations based on the ADP protocol. This UDP module 620 can have server, client, and protocol submodules.

The server submodule joins the endpoint 150 to a subnet group, which will be used for sending broadcast packets. It listens in on the subnet group, while simultaneously sending packets over the subnet as required by the protocol during an interaction. The client submodule may also be functionally coupled to or part of the server submodule, and interprets the packets that are being transmitted by the server submodule. The client submodule is the link between the UDP module 620 and the rest of the ADP handling components of the tuner software for the endpoint 150. The client submodule also is used by other ADP handling components to drive the multi-endpoint sharing host process described above for obtaining content from and serving content to other endpoints 150.

The internal structure of the tuner software for the endpoint 150 described above is illustrative and by way of example only, and other software structures and modules may be used to achieve the endpoint 150 functionality.

In one embodiment, not all endpoints 150 on a subnet have the ability to respond to broadcast requests for content or the ability to serve content to other endpoints.

Thus, the endpoints 150 can become dynamic virtual proxies for an entire subnet. Every request from an endpoint 150 to download content can involve a different subset of the endpoints 150 acting as dynamic proxies for that request, depending on the files that endpoint 150 holds or is currently downloading. As more of the endpoints 150 on a subnet accumulate the files for a channel, the likelihood increases that a requesting endpoint 150 can obtain any needed file from another endpoint 150, instead of having to obtain the file from the master transmitter 110. By transferring the server functions from the master transmitter 110 to the mesh of endpoints 150, an enterprise can achieve a higher performance content distribution network without the need for ever-increasing numbers of dedicated servers.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Various changes in the details of the illustrated operational methods are possible without departing from the scope of the following claims. For instance, illustrative flowchart steps or process steps of FIG. 5 may perform the identified steps in an order different from that disclosed here. Alternatively, some embodiments may combine the activities described herein as being separate steps. Similarly, one or more of the described steps may be omitted, depending upon the specific operational environment in which the method is being implemented. In addition, acts in accordance with FIGS. 4-6 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of distributing content, the method comprising:

requesting, from a server computer by a first client computer of a plurality of client computers, an index of the content, the index including a list of associated files for the content;

receiving, by the first client computer, the index of the content from the server computer;

identifying, by the first client computer, a first file listed in the index that is not currently held by the first client computer of the plurality of client computers;

requesting the first file from a second client computer of the plurality of client computers if the second client computer of the plurality of client computers can distribute the first file to the first client computer, wherein requesting the first file from the second client computer comprises:

broadcasting information about the first file to more than one of the plurality of client computers;

receiving a response from the second client computer of the plurality of client computers indicating that the second client computer can distribute the first file to the first client computer; and requesting the first file from the second client computer of the plurality of client computers;

requesting the first file from a server computer if no client computer of the plurality of client computers can distribute the first file to the first client computer; and receiving the first file on the first client computer.

2. The method of claim 1, wherein requesting the first file from the second client computer further comprises:

selecting the second client computer from multiple client computers of the plurality of client computers if the first client computer receives responses from the multiple client computers of the plurality of client computers indicating that each of the multiple client computers can distribute the first file to the first client computer.

3. The method of claim 1, wherein receiving the first file on the first client computer comprises:

establishing a sequence of checkpoints while receiving the first file on the first computer; and restarting the receiving of the first file on the first computer from a most recently established checkpoint of the sequence of checkpoints if the receiving of the first file on the first computer is interrupted.

4. The method of claim 1, wherein requesting the first file from the second client computer further comprises:

requesting a first portion of the first file from the second client computer; and requesting a second portion of the first file, the second portion being different from the first portion, from a third client computer of the plurality of client computers.

5. The method of claim 1, further comprising:

scheduling distribution of the content to the first client computer and to a fourth client computer of the plurality of client computers, wherein distribution of the content to the first client computer is scheduled at a different time than distribution of the content to the fourth client computer.

6. The method of claim 1, wherein indicating that the second client computer can distribute the first file to the first client computer comprises:

indicating that the second client computer holds all of the first file.

7. The method of claim 1, wherein indicating that the second client computer can distribute the first file to the first client computer comprises:

indicating that the second client computer is obtaining the first file; and indicating how much of the first file the second client computer has obtained.

8. The method of claim 1, wherein indicating that the second client computer can distribute the first file to the first client computer comprises:

indicating a load upon the second client computer.

9. The method of claim 1, wherein indicating that the second client computer can distribute the first file to the first client computer comprises:

indicating how many clients are receiving files from the second client computer.

10. The method of claim 9, wherein requesting the first file from the second client computer further comprises:

requesting the first file from the second client computer; and receiving a rejection from the second client computer if the second client computer is servicing more than a predetermined number of requests for files.

11. The method of claim 1, further comprising:

receiving a request for the first file from another client computer of the plurality of client computers; and sending the first file to the another client computer while receiving the first file from the second client computer.

12. The method of claim 1, further comprising:

receiving a broadcast message from another client computer of the plurality of client computers asking which of the plurality of client computers has a second file; and in the event the second file is held by the first client computer:

responding to the broadcast message with an indication that the first client computer has the second file;

receiving a request for the second file from the another client computer; and sending the second file to the another client computer while receiving the first file from the second client computer.

13. A non-transitory computer readable medium with instructions for a client computer stored thereon wherein the instructions cause a processor of the client computer to perform the method of claim 1.

14. A content distribution system comprising:

a server computer; and a plurality of client computers communicatively coupled to each other and to the server computer, at least one of the plurality of client computers being programmed to perform at least a portion of the method of claim 1, wherein the entire method of claim 1 is performed collectively by the server computer and the plurality of client computers.

15. A method of distributing content, the method comprising:

requesting, from a server computer by a first client computer of a plurality of client computers, an index of the content, the index including a list of associated files for the content;

receiving, by the first client computer, the index of the content from the server computer;

identifying, by the first client computer, a first file listed in the index that is not currently held by the first client computer of the plurality of client computers;

requesting the first file from a second client computer of the plurality of client computers if the second client computer of the plurality of client computers can distribute the first file to the first client computer, wherein requesting the first file from the second client computer comprises:

broadcasting information about the first file to more than one of the plurality of client computers;

creating a list of client computers that can distribute the first file to the first client computer;

selecting the second client computer from the list of client computers that can distribute the first file to the first client computer; and requesting the first file from the second client computer; and receiving the first file on the first client computer, wherein receiving the first file on the first client computer comprises:

establishing a sequence of checkpoints while receiving the first file on the first client computer;

requesting the first file from a third client computer of the list of client computers that can distribute the first file to the first client computer if receiving the first file on the first client computer is interrupted; and receiving the first file on the first client computer from the third client computer from a most-recently established checkpoint of the sequence of checkpoints.

16. An endpoint computer for use with a content distribution system comprising a server computer and a plurality of client computers, the endpoint computer comprising:

a processor; and a tuner process, wherein the processor is programmed to execute the tuner process to perform the operations of:

requesting, from the server computer, a content index of a content for distribution by the content distribution system, the content index including a list of associated files for the content;

receiving, from the server computer, the content index;

identifying, by the endpoint computer, a first file listed in the content index that is not currently held by the endpoint computer;

requesting the first file from a second client computer of the plurality of client computers if the second client computer of the plurality of client computers can distribute the first file to the endpoint computer, wherein requesting the first file from the second client computer comprises:

broadcasting information about the first file to more than one of the plurality of client computers;

receiving a response from the second client computer of the plurality of client computers indicating that the second client computer can distribute the first file to the endpoint computer; and requesting the first file from the second client computer of the plurality of client computers;

requesting the first file from the server computer if no client computer of the plurality of client computers can distribute the first file to the endpoint computer; and receiving the first file on the endpoint computer.

17. The endpoint computer of claim 16, further comprising:

a first policy data; and wherein the operation of requesting the first file from the second client computer further comprises:

selecting, in accordance with the first policy data, the second client computer from multiple client computers of the plurality of client computers if the first client computer receives responses from the multiple client computers of the plurality of client computers indicating that each of the multiple client computers can distribute the first file to the first client computer.

* * * * *

UNITED STATES PATENT AND TRADEMARK OFFICE
CERTIFICATE OF CORRECTION

PATENT NO. : 8,775,456 B2
APPLICATION NO. : 12/552169
DATED : July 8, 2014
INVENTOR(S) : Nitish Shrivastava et al.

It is certified that error appears in the above-identified patent and that said Letters Patent is hereby corrected as shown below:

On the Title page, in item (75), in column 1, in "Inventor", line 1, delete "Mahaarashtra" and insert -- Maharashtra --, therefor.

Signed and Sealed this
Thirtieth Day of September, 2014

Michelle K. Lee
*Deputy Director of the United States Patent and Trademark Office*